APPARATUS FOR FORMING AN ALL-LOWER SIDEBAND GROUP SIGNAL OUTPUT

Filed May 1, 1967 2 Sheets-Sheet 1

INVENTORS
PAUL M. THRASHER
KUNO M. ROEHR
BY Harry A. Herbert Jr. and
Herbert F. Farmer
ATTORNEYS

APPARATUS FOR FORMING AN ALL-LOWER SIDEBAND GROUP SIGNAL OUTPUT

Filed May 1, 1967 2 Sheets-Sheet 2

INVENTORS
PAUL M. THRASHER
KUNO M. ROEHR
BY Harry A. Herbert Jr
Herbert E. Tarmer
ATTORNEYS 3,501,594

APPARATUS FOR FORMING AN ALL-LOWER SIDEBAND GROUP SIGNAL OUTPUT

Paul M. Thrasher, Bethesda, and Kuno M. Roehr, Silver Spring, Md., assignors to the United States of America as represented by the Secretary of the Air Force Filed May 1, 1967, Ser. No. 635,976
Int. Cl. H03j 3/00
U.S. Cl. 179—15 3 Claims

ABSTRACT OF THE DISCLOSURE

In combination with a voice channel communication system which utilizes the ISAM (Integrated Switching and Multiplexing) modulation principle, a low-pass filter and a wideband pass filter are added to form a group of all channels having inverted sidebands by using two modulation steps for odd-numbered bandpass filters and one modulation step for the even-numbered bandpass filters. An all-upper sideband group can be similarly formed by proper selection of filter pass bands.

This invention relates in general to communication systems, and more particularly, to the field of voice channel type communication and switching systems, and has the object of using the ISAM modulating principle to form an all lower, or upper, sideband group.

To accomplish the above and other objects, the present invention comprehends the modification of the integrated frequency-division multiplexing, time-division switching system described in the IBM Journal of Research and Development, vol. 9, No. 2, pp. 137–140, March 1965 entitled "A New Method for Frequency-Division Multiplexing, and Its Integration With Time-Division Switching" by P. M. Thrasher. The instant system involves two modulation steps for alternate 4 kc. bandpass filters and one for the others. The 8 to 12, 16 to 20, 24 to 32 . . . and 48 to 52 kc. bandpass filters have their outputs combined and connected to a 0–58 kc. low pass filter. The wideband output from this filter is sampled at 116 kc. and the resulting trains of pulses applied to the 58 to 116 kc. wideband bandpass filter. On the other hand, the 100 to 104, 92 to 96, 84 to 88 . . . and 60 to 64 kc. bandpass filters have their outputs combined, and go directly to the output where they are further combined with the wideband output from the 58 to 116 kc. filter. The result is a group with all channels having inverted sidebands.

Other objects, aspects, features and advantages of the invention will best be understood by referring to the following detailed description taken in conjunction with the accompanying drawings, wherein:

FIGURE 1*a* is a block diagram of the prior art;

Figure 1A:
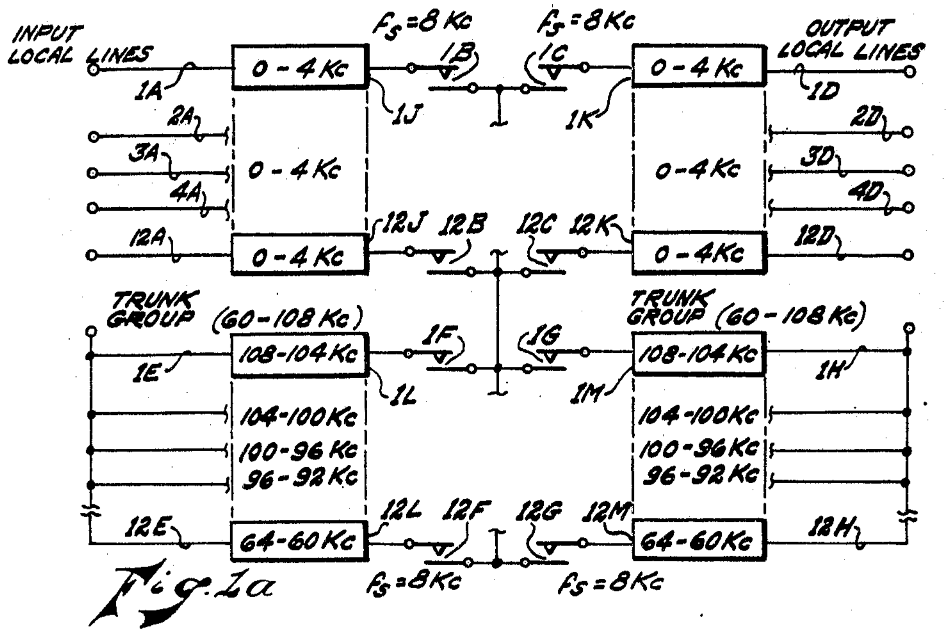
FIGURE 1 is a block diagram of the preferred embodiment.
Figure 1:
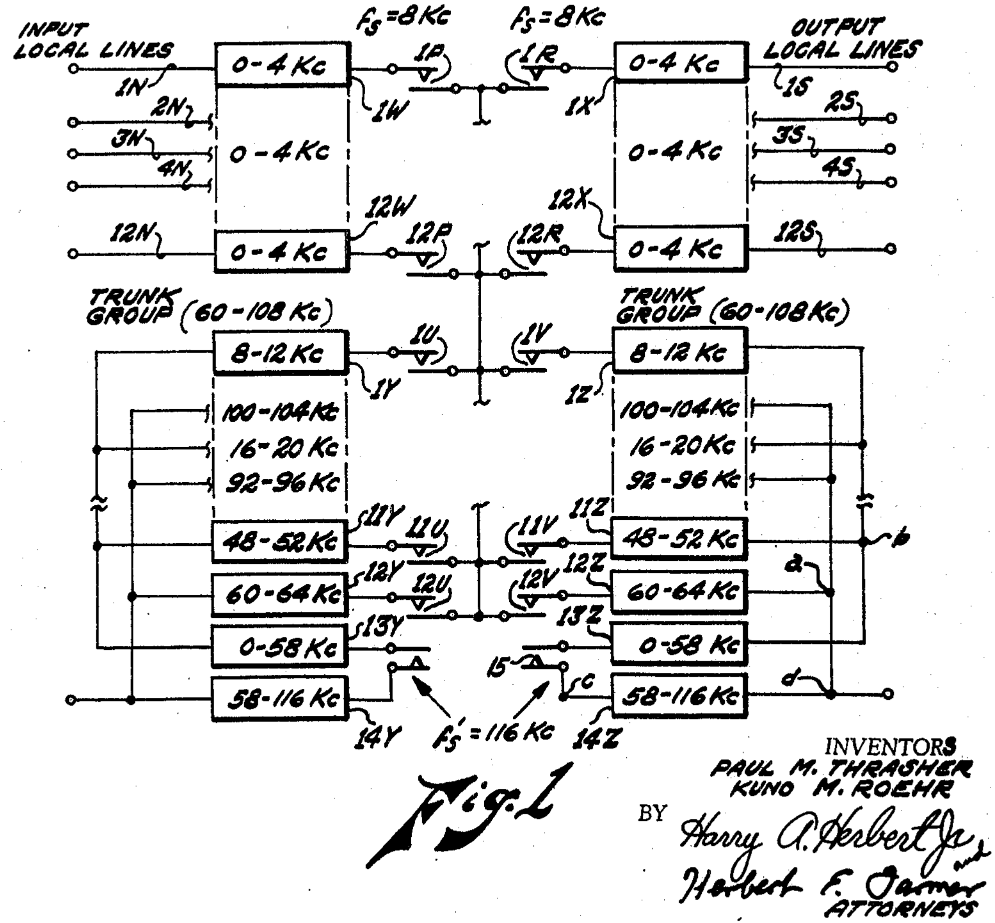

For a proper understanding of the present invention, it is desirable to first consider the operation of the system shown in FIGURE 1*a*, which system is explained in greater detail in the above-cited publication. It is also well to note that a detailed description and the operation of like components in FIGURE 1*a* and FIGURE 1 is presented in Technical Report No. RADC–TR–65–370, July 1966 entitled "Integrated Switching and Multiplexing" by P. M. Thrasher, R. J. Ward and K. M. Roehr, which report is further identified as AD489,541.

In FIGURE 1*a*, there are twelve local lines in and out, 1A . . . 12A and 1D . . . 12D, respectively. Low-pass filters 1J . . . 12J and 1K . . . 12K have pass bands from 0 to 4 kc. Bandpass filters 1L . . . 12L and 1M . . . 12M have adajcent 4 kc. pass bands as indicated in the drawing. Output sampling switches 1C . . . 12C and 1G . . . 12G close in fixed order. Input switches 1B . . . 12B and 1F . . . 12F close in an order dictated by the desired connections. The sampling rate is $f_s$=8 kc. Generalized resonant transfer is included as part of the switching process between filters. The twelve trunk channels in the region from 60 kc. to 108 kc. in 4 kc. increments are formed in one modulation step from the baseband. The modulated baseband signals are translated along the frequency axis into an array of upper and lower sideband signals as shown at B in FIGURE 2. Such is for the situation in which all local lines 1A . . . 12A are switched out to the trunk channels 1H . . . 12H in the order 1B to 1G, 2B to 2G, . . . 12B to 12G.

Figure 2:
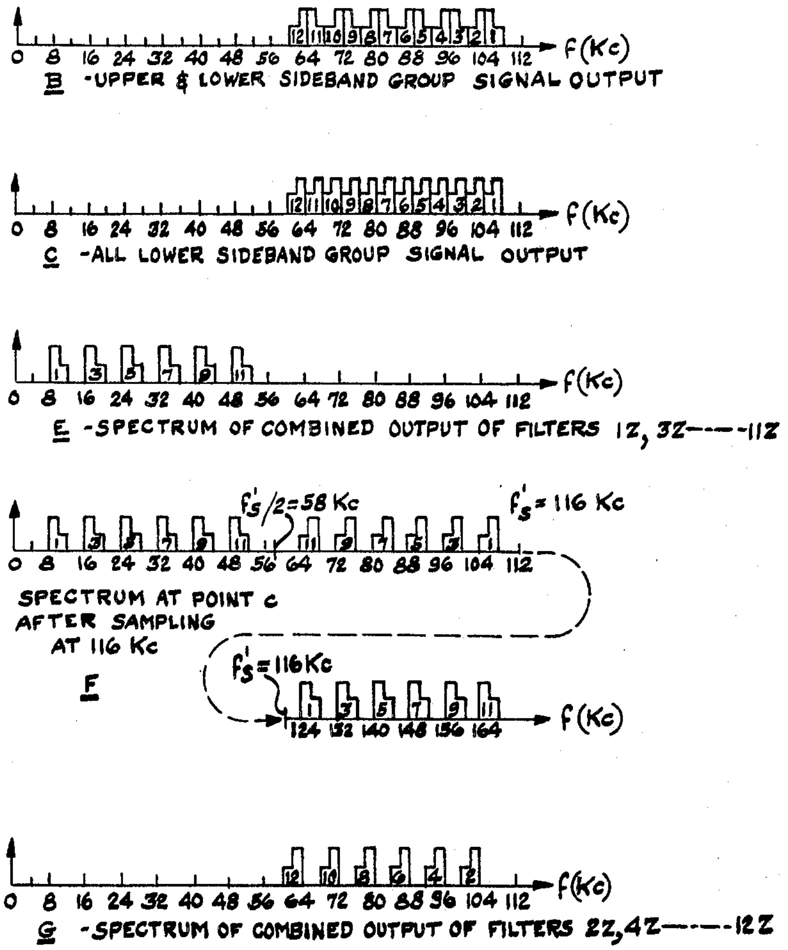
FIGURE 2 is a graph of the generated spectral signal displays.

The difference in the present invention is the forming of all lower sideband group signal output shown at C in FIGURE 2 as distinguished from the upper and lower sideband group signal output shown at B in FIGURE 2. This system also employs generalized resonant transfer as part of the switching process between filters. The instant system is shown in FIGURE 1. Low-pass filter 1W . . . 12W and 1X . . . 12X have pass bands from 0 to 4 kc. Bandpass filters 1Y . . . 12Y and 1Z . . . 12Z have adjacent 4 kc. pass bands as indicated. The all-lower sideband group is formed by using two modulation steps for odd-numbered bandpass filters and one modulation step for the others. On the output trunk group side, filters 1Z, 3Z, . . . 11Z have their outputs combined and connected to low-pass filter 13Z having a pass band from 0 to 58 kc. The wideband output from this filter is sampled at $f'_s$=116 kc. by sampling gate 15. The resulting train of pulses is applied to the wideband bandpass filter 14Z having a pass band from 58 kc. to 116 kc. The even-numbered filters 2Z, 4Z . . . 12Z also have their outputs combined. These outputs go directly to point *a* from which they are further combined with the wideband outputs from filter 14Z. The result is a group of all channels having inverted sidebands. The input trunk group side is arranged similarly.

As an example of system operation, consider the case where all twelve local lines 1N . . . 12N are assumed to be switched out to the trunk channels in the order 1P to 1V, 2P to 2V . . . 12P to 12V. This switching comprises the first modulation step and results in the spectrum shown at B if the system is configured as the original system labeled Prior Art. However, combining the outputs of filters 1Z, 3Z . . . 11Z in FIGURE 1 results in a spectrum at point *b* in FIGURE 1 having all upper sidebands as shown at E in FIGURE 2. This spectrum is passed by low-pass filter 13Z and sampled by sampling switch 15 at a rate of $f'_s$=116 kc. This sampling comprises the second modulation step and results in a spectrum at point *c* in FIGURE 1 as shown at F in FIGURE 2. The upper sidebands from 8 kc. to 52 kc. at E in FIGURE 2 are inverted and appear as all lower sidebands between 64 kc. and 108 kc. at F in FIGURE 2. This latter group of lower sidebands is passed by bandpass filter 14Z. The outputs from filters 2Z, 4Z . . . 12Z are combined at point *a* in FIGURE 1 and result in the spectrum shown at G in FIGURE 2. This spectrum also contains all lower sidebands. This spectrum at point *a* in FIGURE 1 and the spectrum from filter 14Z are combined together at point *d* in FIGURE 1 resulting in the all-lower sideband group signal output shown at C in FIGURE 2. An all-upper sideband group output can similarly be formed by proper selection of filter pass bands.

Therefore, while a single embodiment of the invention has been shown and described, it is to be understood that the invention is not limited thereto but contemplates such modifications and further embodiments as may occur to those skilled in the art without departing from the spirit and the scope of the invention.

We claim:

1. A voice channel communication system utilizing the integrated switching and multiplexing modulation principle comprising in combination a plurality of local, low frequency input lines and distant, high frequency input channels in combination with a plurality of local, low frequency output lines and distant, high frequency output channels, each of said input and output channels having an associated bandpass filter, all of said lines and channels interconnected by digital heterodyning circuitry comprising sampling gates and timing control circuitry whereby any input signal on an input line or channel can be switched to any output line or channel, apparatus for providing an all-lower sideband group signal output comprising low-pass filter means having as an input the combined outputs from the odd-numbered bandpass filters in said plurality of bandpass filters associated with said plurality of output channels, sampling gate means connected to the output of said low-pass filter means, and wideband pass filter means connected to the output of said sampling gate means, and means for combining the output from said wideband filter means with the combined outputs from the even-numbered bandpass filters associated with said plurality of output channels to provide a group of output signals all having inverted sidebands.

2. The apparatus as described in claim 1 which further includes second low-pass filter means having an input connected to the combined outputs from the odd-numbered bandpass filters associated with said plurality of input channels, second sampling gate means connected to the output of said second low-pass filter means, and second wideband bandpass filter means connected to the output of said second sampling gate means, and second means for combining the output from said second wideband bandpass filter means with the combined outputs from the even-numbered bandpass filters associated with said plurality of input channels.

3. The apparatus as described in claim 1 wherein said low-pass filter means has a pass band from 0–58 kc., the output from said low-pass filter means is sampled by said sampling gate means at $f_s'=116$ kc., and said wideband bandpass filter means has a pass band from 58–116 kc.

References Cited

UNITED STATES PATENTS

| | | | |
|---|---|---|---|
| 2,866,000 | 12/1958 | Caruthers | 179—15 |
| 3,205,310 | 9/1965 | Schlichte | 179—15 |
| 3,399,278 | 8/1968 | Dahlman | 179—15 |

OTHER REFERENCES

P. M. Thrasher, "A New Method for Frequency Division Multiplexing and Its Integration With Time Division Switching," IBM Journal of Research and Development, March 1965, pp. 137–140, TK 7885 A1I15.

RALPH D. BLAKESLEE, Primary Examiner

A. B. KIMBALL, Jr., Assistant Examiner

U.S. Cl. X.R.

325—50